(12) United States Patent
Kenthapadi et al.

(10) Patent No.: US 10,552,465 B2
(45) Date of Patent: Feb. 4, 2020

(54) GENERATING TEXT SNIPPETS USING UNIVERSAL CONCEPT GRAPH

(71) Applicant: Microsoft Technology Licensing, LLC, Redmond, WA (US)

(72) Inventors: Krishnaram Kenthapadi, Sunnyvale, CA (US); Kevin Kao, San Jose, CA (US); Jeffrey Warren Lee, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 466 days.

(21) Appl. No.: 15/047,486

(22) Filed: Feb. 18, 2016

(65) Prior Publication Data

US 2017/0242917 A1 Aug. 24, 2017

(51) Int. Cl.
| | |
|---|---|
| G06F 16/33 | (2019.01) |
| G06F 16/901 | (2019.01) |
| G06F 16/34 | (2019.01) |
| G06Q 10/10 | (2012.01) |
| H04L 29/08 | (2006.01) |

(52) U.S. Cl.
CPC ........ *G06F 16/334* (2019.01); *G06F 16/3334* (2019.01); *G06F 16/3344* (2019.01); *G06F 16/345* (2019.01); *G06F 16/9024* (2019.01); *G06Q 10/1053* (2013.01); *H04L 67/306* (2013.01)

(58) Field of Classification Search
CPC combination set(s) only.
See application file for complete search history.

(56) References Cited

U.S. PATENT DOCUMENTS

| | | | |
|---|---|---|---|
| 8,626,761 B2 * | 1/2014 | Kawai | G06F 17/30705 707/736 |
| 2007/0226204 A1 * | 9/2007 | Feldman | G06F 17/3061 |
| 2008/0033932 A1 * | 2/2008 | DeLong | G06F 17/30864 |

(Continued)

FOREIGN PATENT DOCUMENTS

| | | |
|---|---|---|
| WO | WO-2009094586 A1 | 7/2009 |
| WO | 2017143096 | 8/2017 |

OTHER PUBLICATIONS

"International Application Serial No. PCT/US2017/018220, International Search Report dated Apr. 12, 2017", 4 pgs.

(Continued)

*Primary Examiner* — Shyue Jiunn Hwa
(74) *Attorney, Agent, or Firm* — Schwegman Lundberg & Woessner, P.A.

(57) ABSTRACT

In an example embodiment, a method for selecting text snippets to display on a computer display is provided. A universal concept graph for phrases relevant to a search domain is created, the universal concept graph representing each phrase as a node and relationships between the phrases as edges between the nodes. A result in the search domain is represented as a subgraph of the universal concept graph by extracting a portion of the universal concept graph containing phrases contained in the result. Then, a score is produced for each node of the subgraph, the score based on a graph analysis algorithm applied to the subgraph. Then text snippets to display for the result are selected to be displayed based on the scores produced in the subgraph for phrases contained in the text snippets.

17 Claims, 13 Drawing Sheets

(56) References Cited

U.S. PATENT DOCUMENTS

| | | | |
|---|---|---|---|
| 2010/0306158 A1* | 12/2010 | Andersen | G06F 17/10 706/52 |
| 2011/0004462 A1* | 1/2011 | Houghton | G10L 15/183 704/9 |
| 2012/0174006 A1* | 7/2012 | Brownell | G06Q 50/01 715/764 |
| 2012/0303603 A1* | 11/2012 | Kim | G06F 17/30056 707/706 |
| 2014/0046934 A1* | 2/2014 | Zhou | G06F 17/30864 707/723 |
| 2014/0172914 A1 | 6/2014 | Elnikety et al. | |
| 2016/0012119 A1* | 1/2016 | Franceschini | G06F 17/30864 707/722 |

OTHER PUBLICATIONS

"International Application Serial No. PCT/US2017/018220, Written Opinion dated Apr. 12, 2017", 7 pgs.

* cited by examiner

GENERATING TEXT SNIPPETS USING UNIVERSAL CONCEPT GRAPH

TECHNICAL FIELD

The present disclosure generally relates to computer technology for solving technical challenges in generation of online data. More specifically, the present disclosure relates to the generating of text snippets using a universal concept graph.

BACKGROUND

There are many instances where the automatic generation of text snippets for display to a computer user are valuable. However, there are technical problems involved in determining how to automatically generate such text snippets. For example, the rise of the Internet has caused the old classified advertisement model of informing potential candidates of job opportunities to migrate towards an online model. In the online model, users will often search or otherwise be presented with job listings matching some criteria. Other than the difference in how the job listings are searched or otherwise obtained, however, the online job searching model is still very similar to the old classified advertisement model. Specifically, the job provider, such as an organization looking to hire, will craft a brief description of the job (called a "job snippet") to try to accomplish the dual goals of attracting the eye of qualified individuals and reducing the number of unqualified individuals that ultimately apply for the job. Creating such job snippets can be quite difficult.

Additionally, in the realm of online job listings, user interaction with the job listing can be important not just for the fulfillment of the particular job listing being viewed but also to the company hosting the job listings. Search engine ranking, either within an individual web site or outside via a general search engine, can be influenced by how users interact with a job listing. In other words, the more users click on or otherwise interact with a particular job listing, the higher the particular job listing will be in the rankings of internal searches within a job listing web site, and the higher the job listing web site itself will be ranked in external web searches. Since job snippet effectiveness has a direct correlation to user interaction with a job listing, the effectiveness of a job snippet therefore has a significant impact on search engine ranking inside and outside of a job listing web site.

BRIEF DESCRIPTION OF THE DRAWINGS

Some embodiments of the technology are illustrated, by way of example and not limitation, in the figures of the accompanying drawings.

FIGS. 8-11 represent exemplary user interfaces for receiving information relevant to a job search and returning job snippets, in accordance with an example embodiment.

DETAILED DESCRIPTION

Overview

Figure 1:
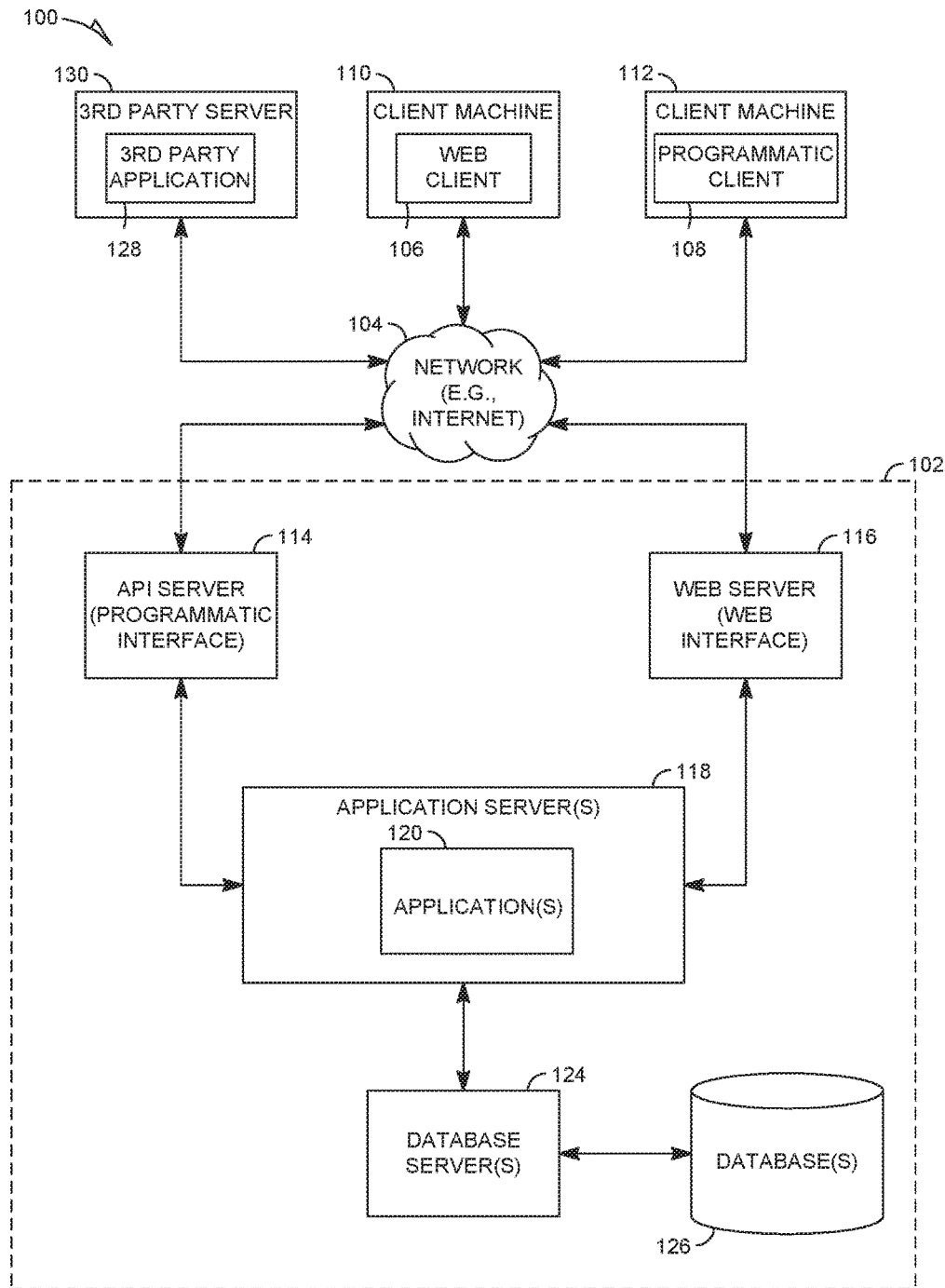
FIG. 1 is a block diagram illustrating a client-server system, in accordance with an example embodiment.

The present disclosure describes, among other things, methods, systems, and computer program products that individually provide functionality for speeding data access. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a systematic framework is provided for improving the quality of job snippets. This may include personalizing the job snippets based on the user viewing the job snippet and/or personalizing the job snippets based on parameters of a job listing search. This may all be accomplished using a universal concept graph.

It should be noted that the term "organization" as used throughout this document should be interpreted broadly to cover any type of entity having individuals as members or employees. This would include both for-profit and non-profit organizations, as well as entities that may not be considered organizations under some definitions of the term, such as governmental entities, clubs, associations, etc. Organizations are also to be contrasted with individuals. While it is possible that an organization may be comprised of a single member or employee, the organization would still be a distinct entity from the individual and an organization record would still be distinct from an individual record.

In an example embodiment, jobs, members, and keywords are represented as subgraphs of a universal concept graph. A universal concept graph is a graph where each node represents a term, phrase, or concept relevant to a job search. This may include, for example, a list of skills, companies, job locations, etc. extracted from a job listing web site, such as explicit skills identified in job listings or in member profiles in the case of a social network. This may also include terms and phrases extracted from outside sources, such as online encyclopedias, which allow for synonyms or similar phrases or concepts to terms explicitly in the job listing or social networking web site to be included as well. The edges between the nodes in the universal concept graph indicate the strength of the relationship between two terms, phrases, or concepts. This strength is an indicator of how closely related two terms, phrases, or concepts are. Thus, for example, the phrase "Java programming" may have a medium close relationship with "computer programming", but a significantly close relationship with "object-oriented language programming," and thus an edge between a node representing "Java programming" and a node representing "computer programming" may have a value less than that of an edge between a node representing "Java programming" and a node representing "object-oriented language programming."

The universal concept graph is customized for the application domain of jobs. Using the universal concept graph enables the system to mine not just the information in job descriptions and member profiles but also orthogonal data signals from external sources. All of these are represented as relevant entities as part of the same underlying graph.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third party application 128, executing on a third party server 130, as having programmatic access to the networked system 102 via the programmatic interface provided by the API server 114. For example, the third party application 128 may, utilizing information retrieved from the networked system 102, support one or more features or functions on a website hosted by a third party. The third party website may, for example, provide one or more functions that are supported by the relevant applications 120 of the networked system 102.

In some embodiments, any website referred to herein may comprise online content that may be rendered on a variety of devices including, but not limited to, a desktop personal computer, a laptop, and a mobile device (e.g., a tablet computer, smartphone, etc.). In this respect, any of these devices may be employed by a user to use the features of the present disclosure. In some embodiments, a user can use a mobile app on a mobile device (any of the client machines 110, 112 and the third party server 130 may be a mobile device) to access and browse online content, such as any of the online content disclosed herein. A mobile server (e.g., the API server 114) may communicate with the mobile app and the application server(s) 118 in order to make the features of the present disclosure available on the mobile device.

Figure 2:
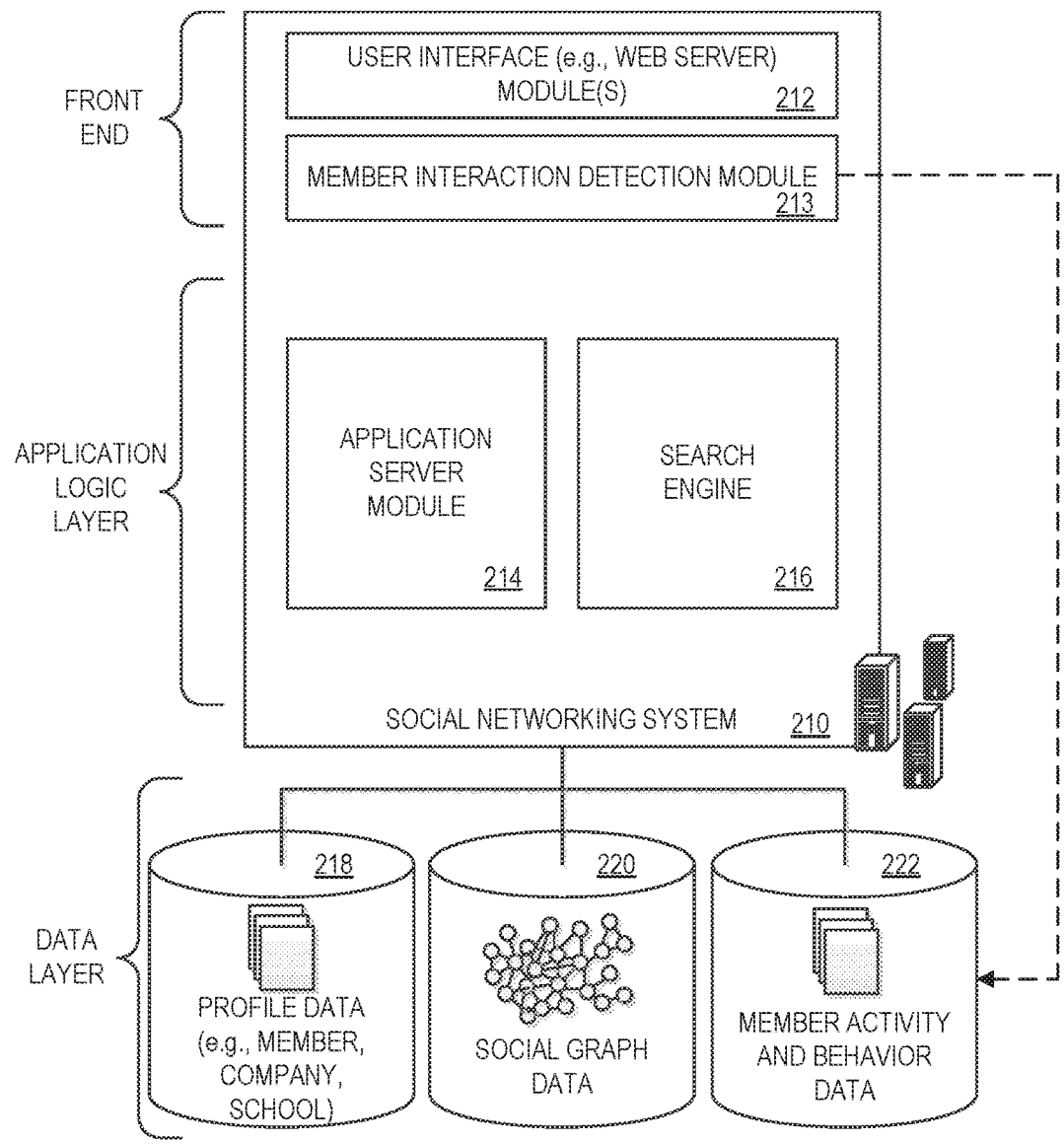
FIG. 2 is a block diagram showing the functional components of a social networking service, in accordance with an example embodiment.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests. In addition, a member interaction detection module 213 may be provided to detect various interactions that members have with different applications 120, services, and content presented. As shown in FIG. 2, upon detecting a particular interaction, the member interaction detection module 213 logs the interaction, including the type of interaction and any metadata relating to the interaction, in a member activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases, such as a profile database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a member has provided information about various job titles the member has held with the same organization or different organizations, and for how long, this information can be used to infer or derive a member profile attribute indicating the member's overall seniority level, or seniority level within a particular organization. In some embodiments, importing or otherwise accessing data from one or more externally hosted data sources may enrich profile data for both members and organizations. For instance, with organizations in particular, financial data may be imported from one or more external data sources, and made part of an organization's profile. This importation of organization data and enrichment of the data will be described in more detail later in this document.

Once registered, a member may invite other members, or be invited by other members, to connect via the social networking service. A "connection" may constitute a bilateral agreement by the members, such that both members acknowledge the establishment of the connection. Similarly, in some embodiments, a member may elect to "follow" another member. In contrast to establishing a connection, the concept of "following" another member typically is a unilateral operation and, at least in some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph in a social graph database 220.

As members interact with the various applications 120, services, and content made available via the social networking service, the members' interactions and behavior (e.g., content viewed, links or buttons selected, messages responded to, etc.) may be tracked, and information concerning the members' activities and behavior may be logged or stored, for example, as indicated in FIG. 2, in the member activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking system 210 provides an API module via which the applications 120 and services can access various data and services provided or maintained by the social networking service. For example, using an API, an application 120 may be able to request and/or receive one or more navigation recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when member profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and member activity and behavior data (stored, e.g., in the member activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
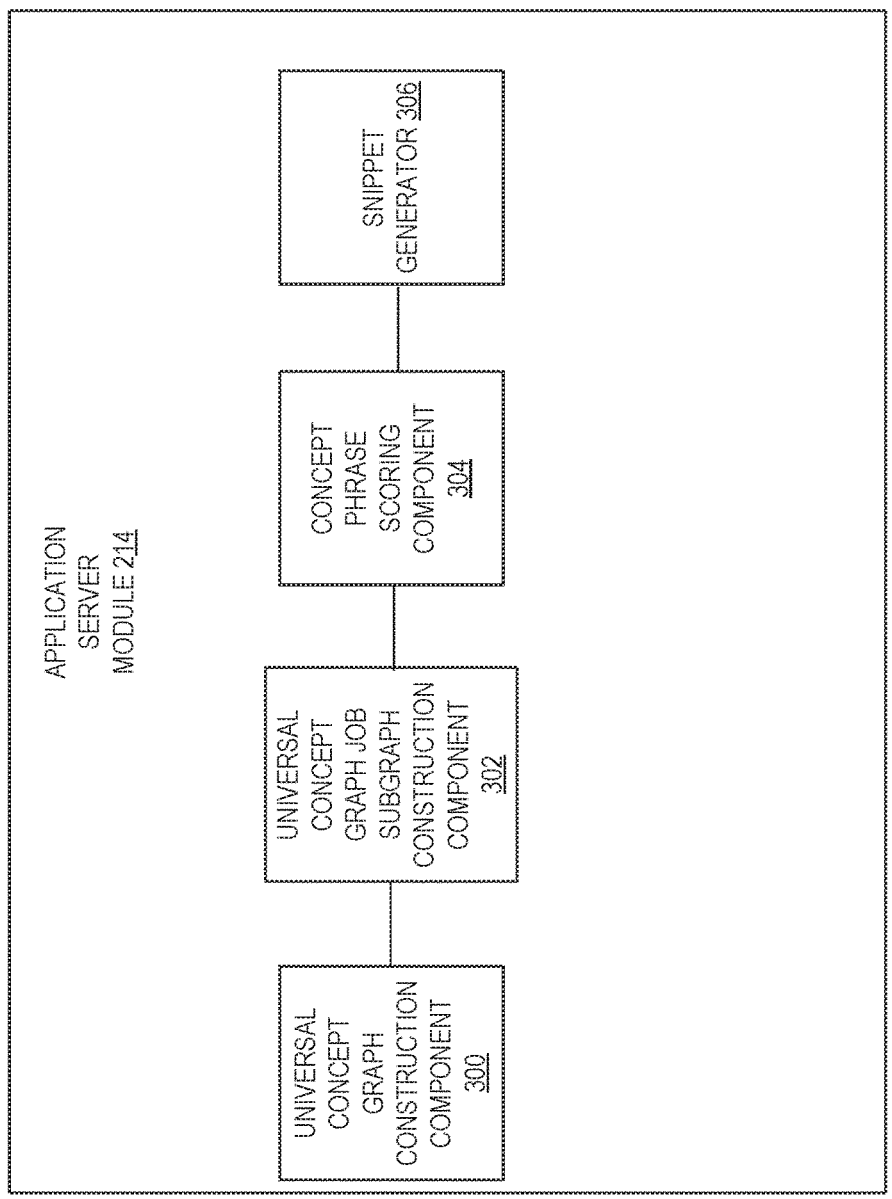
FIG. 3 is a block diagram illustrating an application server module in more detail, in accordance with an example embodiment.

FIG. 3 is a block diagram illustrating the application server module 214 of FIG. 2 in more detail. The application server module 214 includes a universal concept graph construction component 300. The universal concept graph construction component 300 acts to construct a universal concept graph that is customized to the domain of jobs. This process will be described in more detail below.

The application server module 214 further includes a universal concept graph job subgraph construction component 302. The universal concept graph job subgraph construction component 302 takes a job j and a universal concept graph as input and represents the job as a sub-graph to the universal concept graph. This process will be described in more detail below.

A concept phrase scoring component 304 takes the subgraph generated by the universal concept graph job subgraph construction component 302 and generates scores for each concept phrase (atomic unit of text) for the job. This includes providing a score for each concept phrase with respect to the job itself, a specified member (if any), and/or a search query (if any). This process will be described in more detail below.

A snippet generator 306 then utilizes the scores from the concept phrase scoring component 304 to return the top k units of text based on the scores, and then forms the top k units of text into an automatically generated job snippet for the job j.

Figure 4:
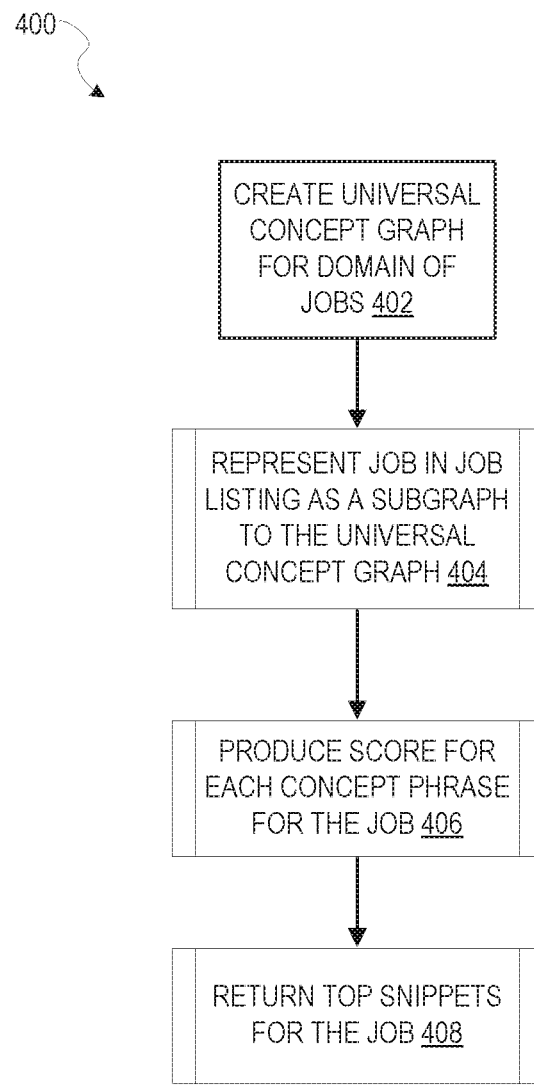
FIG. 4 is a flow diagram illustrating a method of generating a snippet for a job identified in a job listing, in accordance with an example embodiment.

FIG. 4 is a flow diagram illustrating a method 400 of generating a snippet for a job identified in a job listing, in accordance with an example embodiment. At operation 402, a universal concept graph for the domain of jobs is created. Here, the universal concept graph is constructed by combining a social network's internal data assets (such as the set of possible skills, set of possible occupation titles, set of educational course names, etc.) with orthogonal and complementary external datasets, such as online encyclopedias (e.g., Wikipedia). A framework for determining key concepts from a given content object is provided, by embedding the content object as part of a universal concept graph. Embedding different content objects as part of the same universal concept graph addresses any vocabulary mismatch problems. Further, using the universal concept graph enables the system to compute a high quality set of key concepts from the given content object, by mining not just the information present in the content object but also the orthogonal data signals from external sources.

Accordingly, the graph generating system may use as input (1) a time t, (2) internal assets (e.g., documents, records, datasets, etc.) of the social networking system, and (3) one or more external structured datasets to generate an output: a universal concept graph, HUCG=(VUCG, EUCG, w) at time t, where HUCG is the universal concept graph, VUCG is a set of nodes of the universal concept graph, EUCG is a set of edges of the universal concept graph, and w is a weight of an edge. The weight of the edge between two nodes may indicate the degree of relatedness of the two concept phrases represented by the two nodes. In some instances, the weight of the edge takes a value between "0.00" and "1.00." In some example embodiments, the universal concept graph is represented as HUCG=(VUCG, EUCG) when no weights are assigned to the edges of the universal concept graph.

In certain example embodiments, the graph generating system determines the set of nodes VUCG for the universal concept graph by taking the union of the set of concept phrases obtained (e.g., extracted, identified, determined, etc.) from internal sources $V_{int}$ and the set of concept phrases obtained from the external dataset $V_{ext}$: VUCG=$V_{int}$ U $V_{ext}$.

$V_{ext}$ denotes the set of external concept phrases obtained from the external structured dataset at time t. In certain example embodiments, $V_{ext}$ corresponds to the set of titles of articles in Wikipedia.

$V_{int}$ denotes the set of internal concept phrases obtained from the internal assets at time t. This set can correspond to one or more (e.g., all) names of skills, occupation titles, educational course names, locations, names of companies, names of universities, etc. identified from the internal data sources of the social networking system. These internal concept phrases may be mapped to the external dataset (e.g., external concept phrases from the external dataset) to obtain canonical versions of the internal concept phrases. The determining of the canonical versions of the internal concept phrases may facilitate the avoidance of duplication of concept phrases when taking the union of the set of internal concept phrases and the set of external concept phrases.

For example, the internal dataset uses the concept phrase "Software Developer," while the external dataset (e.g., Wikipedia) uses the concept phrase "Software Engineer." To obtain the canonical version of every phrase, the graph generating system may use the redirection mechanism associated with the external dataset. For instance, the graph generating system issues a query to a device storing the external dataset. The query includes the term "Software Developer." In response to the query from the graph generating system, the device storing the external dataset automatically redirects the query to the page corresponding to the canonical version (e.g., "Software Engineer") of the term included in the query. There could be a chain of redirects. Following the chain of redirects and mapping every term in the internal dataset to the corresponding canonical version of the term is one way to standardize (e.g., unify, consolidate, etc.) the used terminology to a single vocabulary for the purpose of building the universal concept graph.

The graph generating system determines the set of relationship edges EUCG, and the edge weight function w, by taking into account the hyperlink structure and the content similarity in the internal and external datasets.

According to various example embodiments, VUCG is defined only in terms of either $V_{ext}$ or $V_{int}$, instead of taking the union of $V_{ext}$ and $V_{int}$.

The universal concept graph may be customized to the domain of jobs by limiting the nodes to concepts that are relevant to jobs. Of course, as will be described later, embodiments are possible where the inventive concepts herein are applied to other types of text snippets than job snippets. In such a case, the universal concept graph can be customized to whatever domain is being searched by selecting nodes relevant to a search domain.

Figure 5:
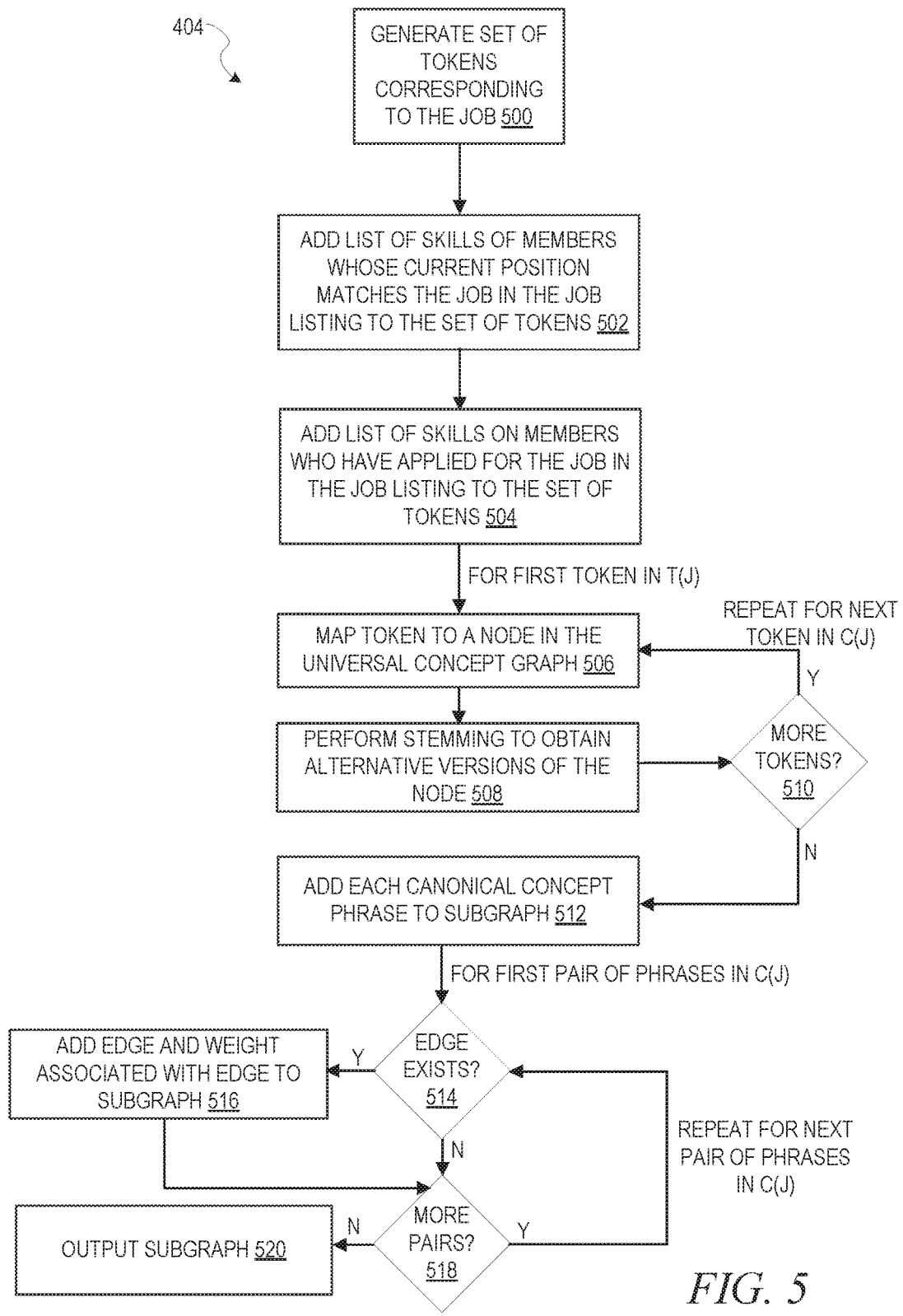
FIG. 5 is a flow diagram illustrating a method of representing a job in a job listing as a subgraph to a universal concept graph in more detail, in accordance with an example embodiment.

At operation 404, the job in the job listing is represented as a sub-graph to the universal concept graph. FIG. 5 is a flow diagram illustrating operation 404 in more detail. At operation 500, a set of tokens corresponding to the job is generated. This includes first extracting any tokens, including unigrams, bigrams, trigrams, etc., from a job listing corresponding to the job. Thus, any information stored in the job listing may be broken down into individual tokens and stored in the set. This may include various combinations of text in a job snippet written by the job provider as well as any skills listed in the job listing. Then, at operation 502, a list of skills of members whose current position matches the job in the job listing is added to the set of tokens. This may include, for example, matching a job title for the job with members having identical job titles, and then extracting skills from those members' profiles. Then, at operation 504, a list of skills of members who have applied for the job in the job listing is added to the set of tokens. This may include, for example, retrieving member profiles for any member who has applied for the job in the job listing and obtaining skills from those member profiles. This set of tokens may then be referred to as T(j).

Then a loop is begun for each token in T(j). First, at operation 506, the token is mapped to a node in the universal concept graph. Then, at operation 508, stemming is performed, where the alternative versions of the node are obtained, such as versions of the token with different endings or suffixes, as well as synonyms. Thus, for example, the result of stemming of "Java Programming" may be "Java Software Programming", "Java Program", "Java Programs", etc. The canonical version may then be selected. The canonical version may be thought of as the "best" version of the term or phrase, although the meaning of "best" may vary depending on the context and the nodes involved. At operation 510, it is determined whether there are any more tokens in T(j). If so, then the method loops to operation 506 for the next token. If not, then the result after all of the loops (one for each token in T(j)) is a set of canonical concept phrases C(j). At operation 512, each canonical concept phrase is added to a subgraph $G_j$.

Then a loop is begun for each pair of phrases in C(j). At operation 514, it is determined if an edge exists between the phrases in the pair in the universal concept graph. If so, then at operation 516 the edge along with the weight associated with the edge are added to $G_j$, and the method proceeds to operation 518. If not, then at operation 518, it is determined if there are any more pairs of phrases in C(j). If so, then the method loops back to operation 514 for the next pair of phrases in C(j). If not, then at operation 520, the subgraph $G_j$ may be output by the universal concept graph job subgraph construction component 302.

Of course, as will be described in more detail later, embodiments are possible where the inventive concepts herein are applied to other types of text snippets than job snippets. In such a case, rather than the job being represented as the subgraph, a result in the search domain is represented as the subgraph.

Referring back to FIG. 4, at operation 406, the concept phrase scoring component 304 takes as input the subgraph $G_j$ for job j and the universal concept graph and produces a score sc for each concept phrase for the job. Additional inputs such as an identification of the member m and/or search query q may also be used in this scoring, if available.

Figure 6:
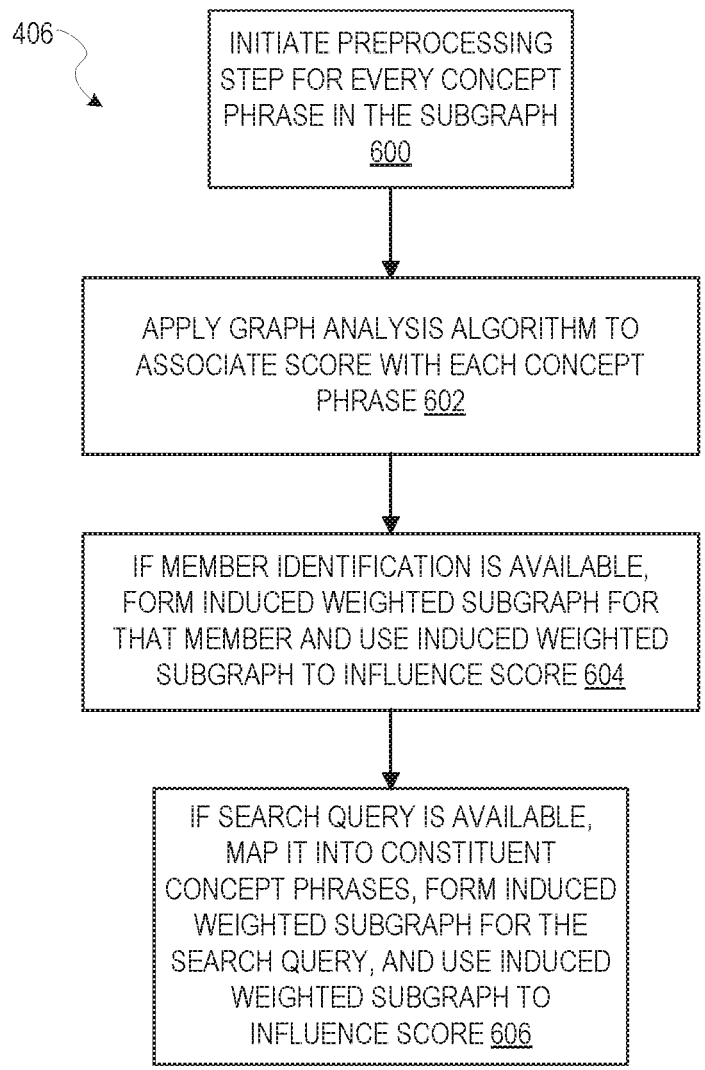
FIG. 6 is a flow diagram illustrating a method of producing a score for each concept phrase in more detail, in accordance with an example embodiment.

FIG. 6 is a flow diagram illustrating operation 406 in more detail. At operation 600, a preprocessing step is initiated for every concept phrase c in $G_j$. Specifically, for every phrase in the universal concept graph an inverse document frequency IDF is computed for c, with respect to the corpus of jobs. Specifically, IDF(c)=log (N/(1+# jobs containing c as a concept phrase)), where N denotes the total number of jobs in the corpus. Then, at operation 602, a graph analysis algorithm such as Page Rank or weighted in-degree ordering is applied to associate a score $\alpha$ (c, j) with each concept phrase c in C(j). Variants may be obtained by choosing a graph over which the graph analysis algorithm is applied. In one example embodiment, the induced subgraph $G_j$ itself is utilized, while in other example embodiments a low fixed number of hops (e.g., 1-3) may be used to expand $G_j$ to include nodes in the universal concept graph that are within that fixed number of hops. The benefit of the latter is that there will be a larger number of paths between nodes in C(j) when the additional nodes are included. For weighted in-degree ordering, the score $\alpha$ (c, j) is defined to be the total weighted degree of each node, and the nodes are ordered in decreasing order of this value. The result is that a score $\alpha$ (c,j) is associated with each concept phrase c in C(j).

At operation 604, if the member identification of the member m is available, then an induced weighted subgraph G(m) for that member m is formed and this induced weighted subgraph is used to influence the score. For each c in C(j), the member-specific score can be computed as follows:

sc (c, m)=f(1+expected # steps required for a random walk originating at c in HUCG to reach any node in G(m)), where f(x) is monotonically decreasing in x. For example, f(x)=1/x, or f(x)=1/log(x).

The intuition is that concept phrases also present in the member subgraph will have the highest score, followed by concept phrases that are in close proximity (and hence very related) to the concept phrases occurring in the member representation.

Likewise, at operation 606, if the search query q is available, then the search query q may be mapped into constituent concept phrases C(q), an induced weighted subgraph for that search query q is formed by selecting nodes in the subgraph that contain the constituent concept phrases, and this induced weighted subgraph is used to influence the score. Specifically, for each c in C(j), the search query-specific score is computed as follows:

sc (c, q)=g(1+expected # steps required for a random walk originating at c in the universal concept graph to reach any concept phrase in C(q)), where g(x) is monotonically decreasing in x. For example, g(x)=1/x, or g(x)=1/log(x).

The intuition is that concept phrases also present in the search query will have the highest score, followed by concept phrases that are in close proximity (and hence very related) to the concept phrases occurring in the search query.

Thus, the result from the concept phrase scoring component 304 is a series of scores. Specifically, each concept phrase c in C(j) has a job score sc (c,j), an optional member score sc (c, m), and an optional search query score sc (c, q).

Figure 7:
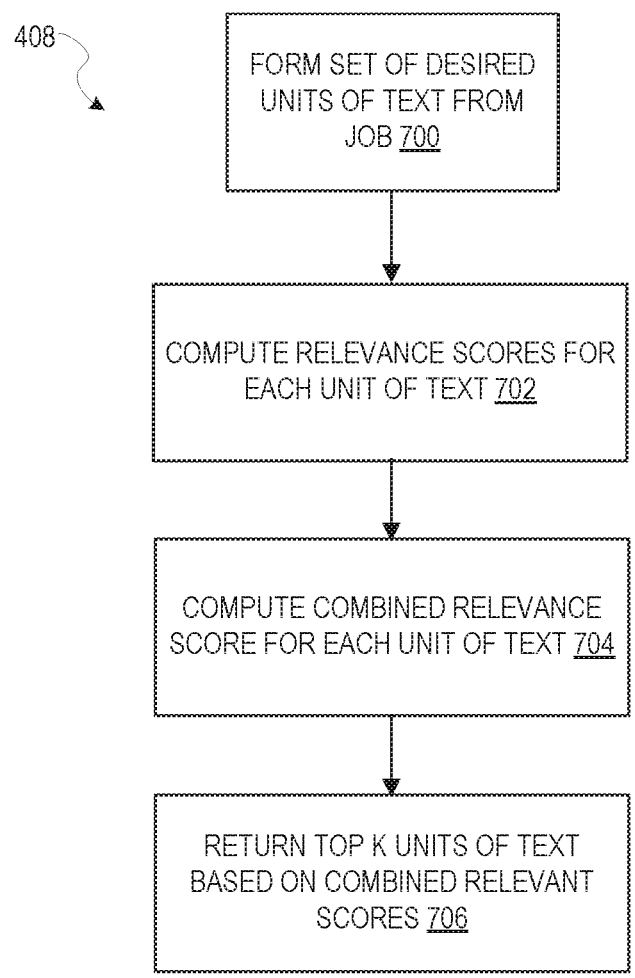
FIG. 7 is a flow diagram illustrating a method of returning top snippets in more detail, in accordance with an example embodiment.

At operation 408, top snippets for the job are returned. FIG. 7 is a flow diagram illustrating operation 408 in more detail. A desired number of snippets k may be a preselected value programmed by, for example, an administrator. At operation 700, the snippet generator 306 takes this input and forms a set of desired units of text (e.g., sentences) from job j. Then, at operation 702, for each such unit of text S, relevance scores may be computed with respect to:

job: s(S,j)=sum\{c in C(j) and c in S\} sc(c, j), in other words, the sum of the scores of all concept phrases for the job present in the unit of text.

member: s(S,m)=\sum_\{c in C(j) and c in S\} $\alpha$ (c, m), in other words the sum of all concept phrases for the member present in the unit of text (if any).

search query: s(S,q)=\sum_\{c in CU) and c in S\} $\alpha$ (c, q), in other words the sum of all concept phrases for the search query present in the unit of text (if any).

Then, at operation 704, a combined relevance score for each unit of text S may be computed as s(S)=h(s(S,j), s(S,m), s(S,q)), where h(x,y,z) is a monotonically increasing function in x, y, and z. For example, h(x, y, z)=xyz, or h(x,y,z)=x log (y) log (z).

At operation 706, the top k units of text S may be returned, based on the combined relevance scores s(S).

The top k units may then be, for example, presented to the user in response to the search query or other action that results in the user being presented job results.

Of course, as will be described in more detail later, embodiments are possible where the inventive concepts herein are applied to other types of text snippets than job snippets. In such a case, the snippets may be through of simply as text snippets as opposed to job snippets.

Figure 8:
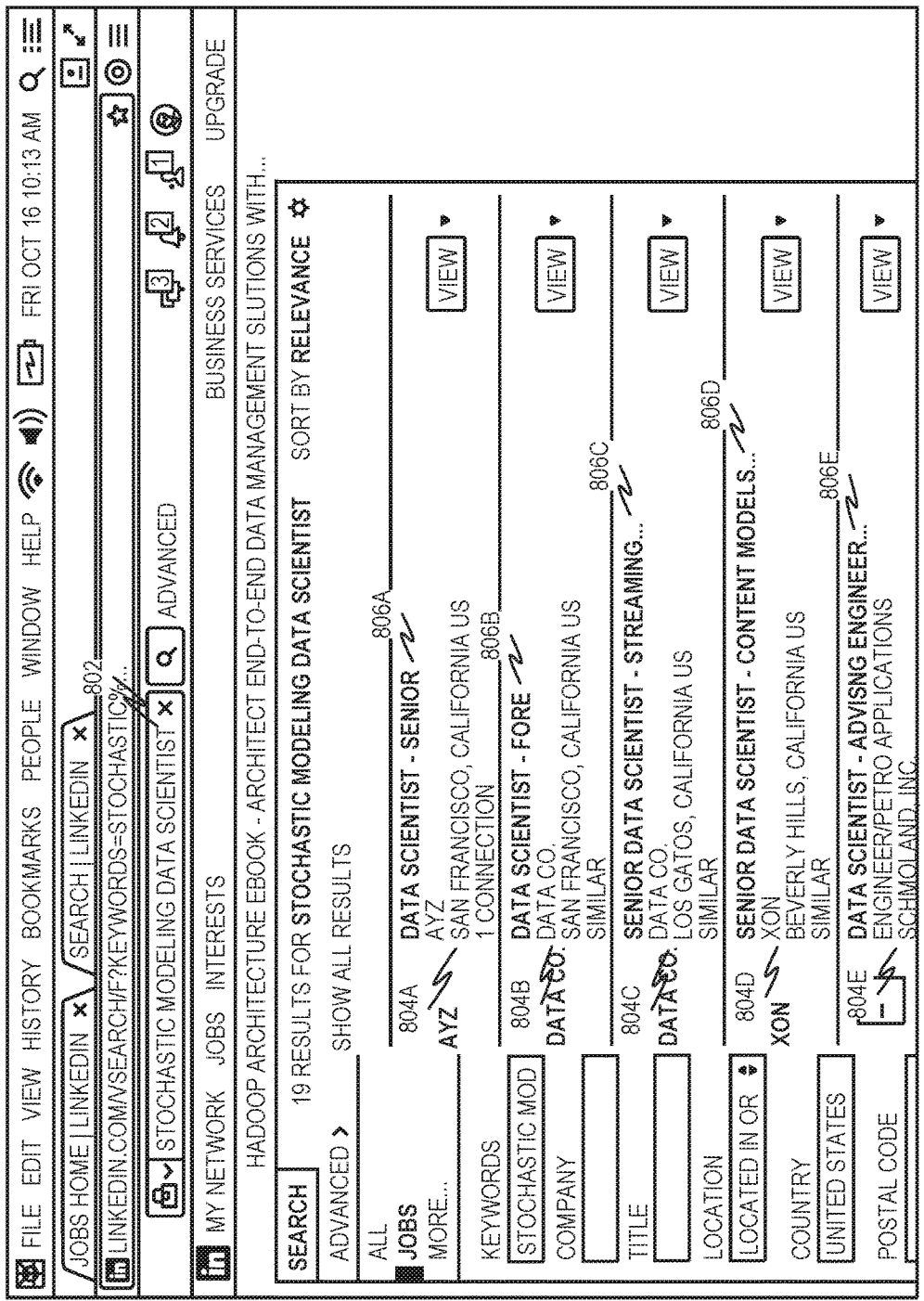

FIGS. 8-11 represent exemplary user interfaces for receiving information relevant to a job search and returning job snippets, in accordance with an example embodiment. Referring first to FIG. 8, here a user interface 800 is provided allowing a member to enter a search query 802. Additionally, while not explicitly depicted, the user interface 800 is only presented to members who have logged in. Thus, once the search query 802 is input by the member, the user interface 800 has information about an identification of the member as well as information about the search query itself. Both of these pieces of information may be used in operation 408 of FIG. 4 to determine which job snippets 804A-804E to include when job posting results 806A-806E are returned to the member.

Figure 9:
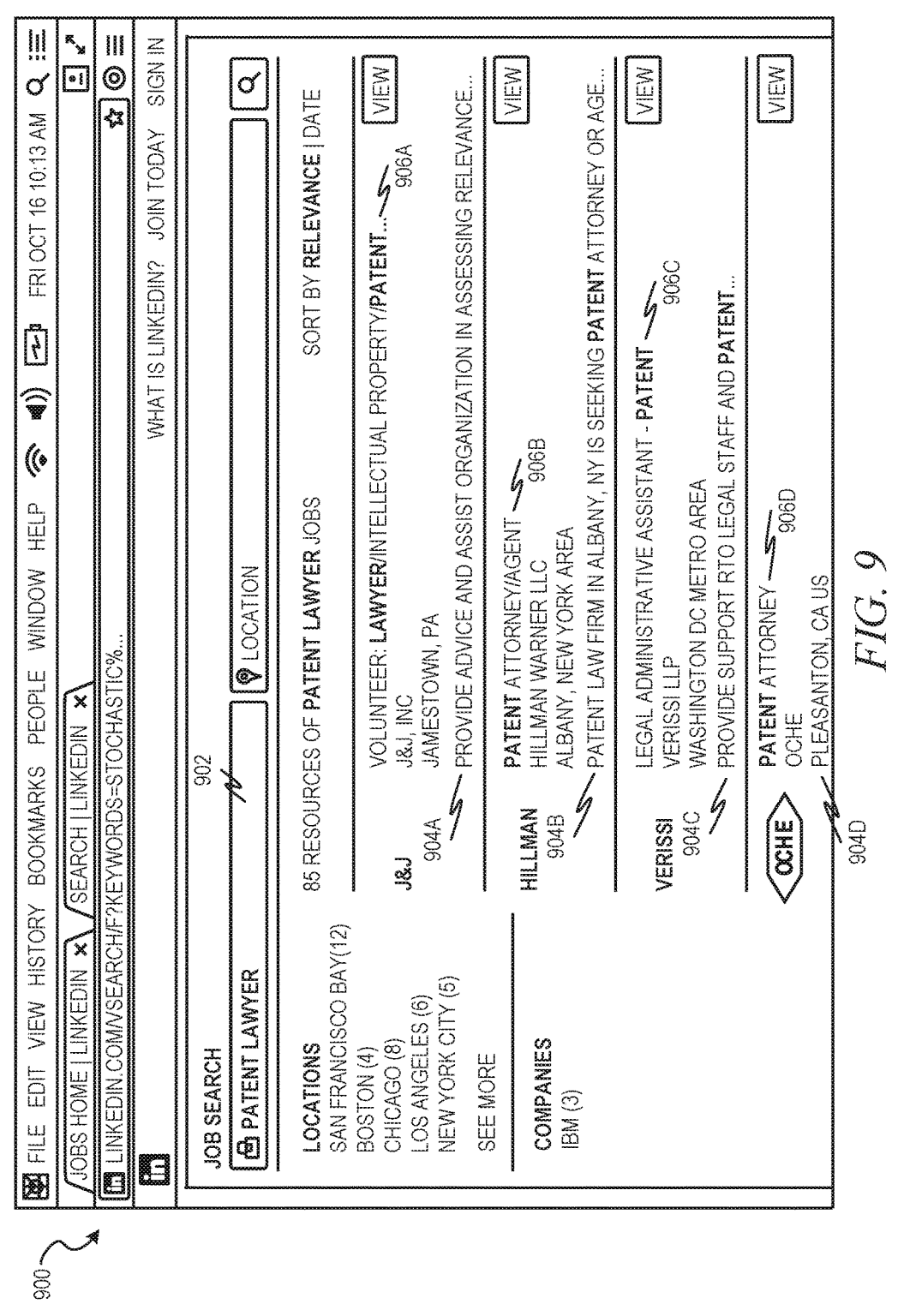

Referring now to FIG. 9, here a user interface 900 is provided allowing a non-member (or at least a user who has not logged in) to enter a search query 902. Thus, once the search query 902 is input by the user, the user interface 900 has information about the search query itself but does not have an identification of the user. As such, operation 408 of FIG. 4 uses the information about the search query but not an identification of a member to determine which job snippets 904A-904D to include when job posting results 906A-906D are returned to the member.

Figure 10:
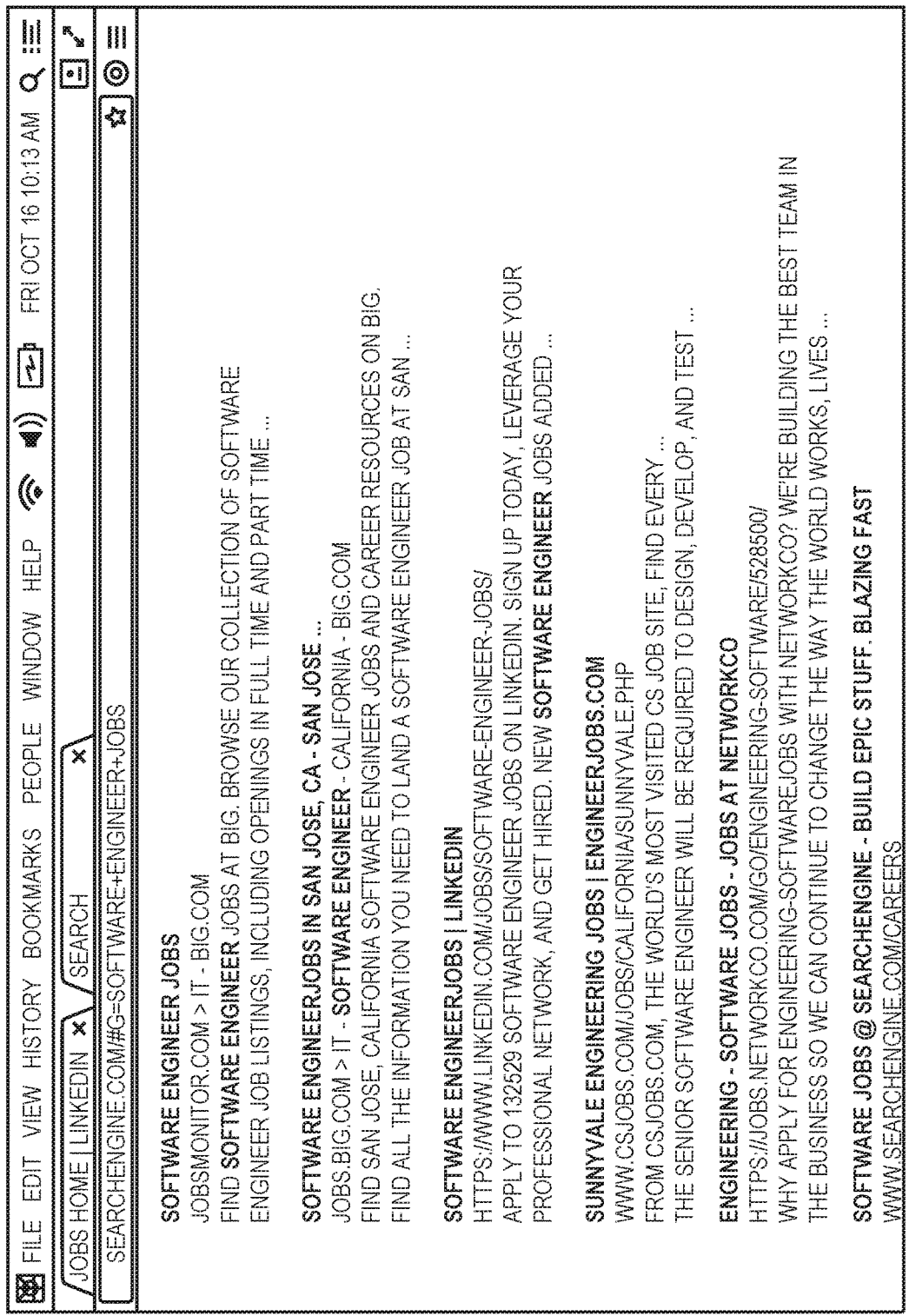

Referring now to FIG. 10, here a general search engine user interface 1000 is provided allowing a non-member to enter a search query. The general search engine user interface 1000 is distinct from a search query user interface used for members who log in to a social network service. For example, the general search engine user interface 1000 is designed to retrieve results for general search queries, whether related to the social networking service (e.g., jobs, people, profiles) or not. Here, the user has already entered a search query for "software engineer jobs." Notably, the way general search engines typically work is to index results for various searches before the searches are performed, and as such the results for "software engineer jobs" have already been indexed before the user enters the search query. As part of that previous indexing, the social network service could elect to create snippets in accordance with the embodiments described above with respect to FIGS. 4-7, using sample search queries to generate such snippets to populate pages for indexing by the general search engine. Thus, the search engine service can prepopulate the snippets for jobs that are the result of general search engine queries. This may be done in a similar manner to that illustrated in FIG. 9, as in both cases the system has at its disposal a search query (whether user-entered or pre-assumed) but does not have an identification of the member/user who will be viewing the job postings as a result of the search query.

Figure 11:
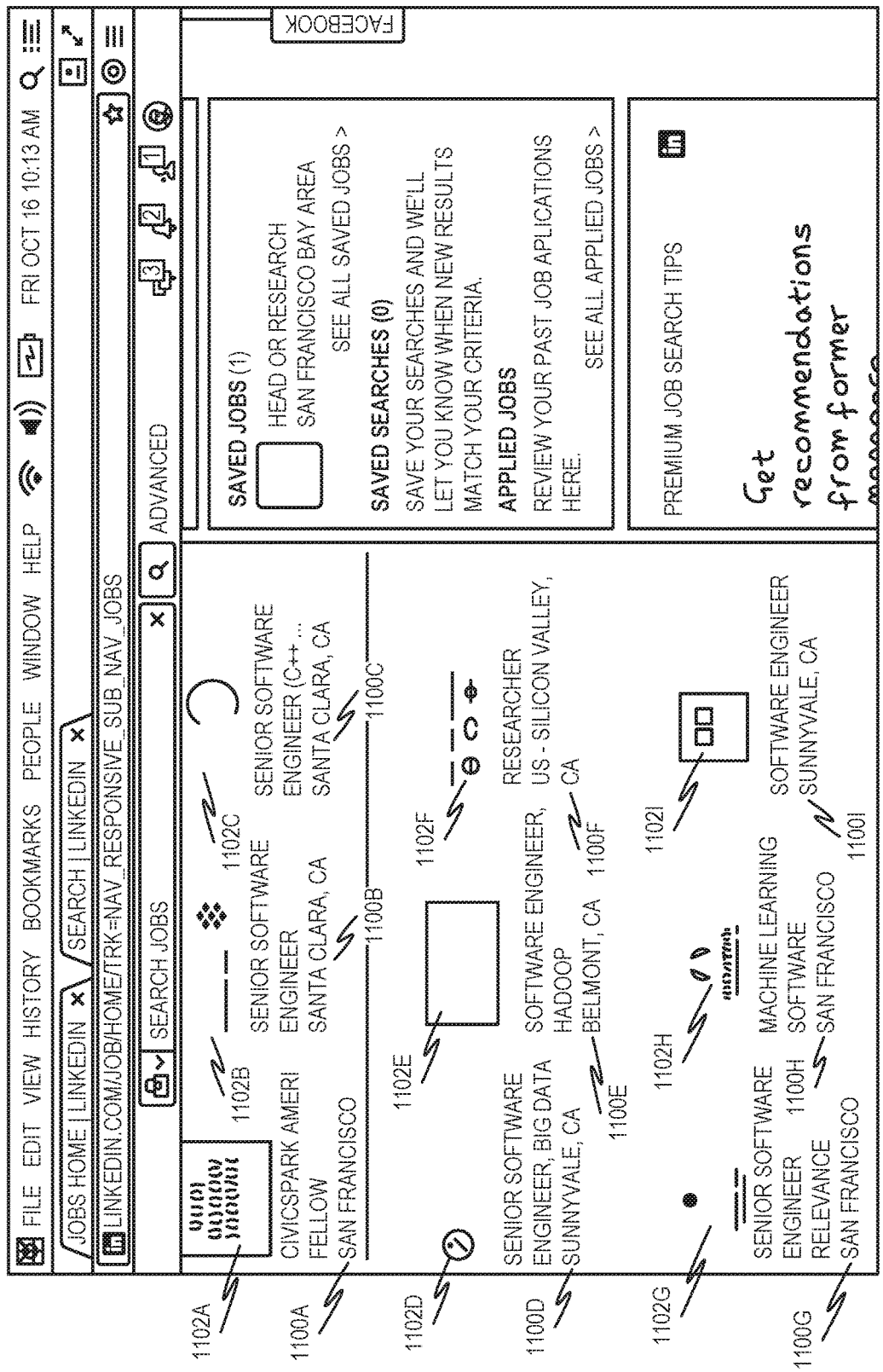

Referring now to FIG. 11, here a member has logged in to a social networking service but has not performed a search query. Rather, the social networking services wishes to provide job recommendations to the member without the member expressly requesting them. In such a case, the system has at its disposal the identification of the member but does not have a search query. As such, operation 408 of FIG. 4 uses an identification of a member but not information about the search query to determine which job snippets 1100A-11001 to include when job posting results 1102A-11021 are returned to the member.

It should be noted that while the above description illustrates concepts related to job snippets, the processes described above can be extended to other types of snippets than job snippets. For example, snippets about members can be provided in a similar manner, with a universal concept graph being limited to the members domain instead of the jobs domain. Universities, companies, news articles, etc. are additional entities about which snippets can be obtained in a similar fashion.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-11 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 12:
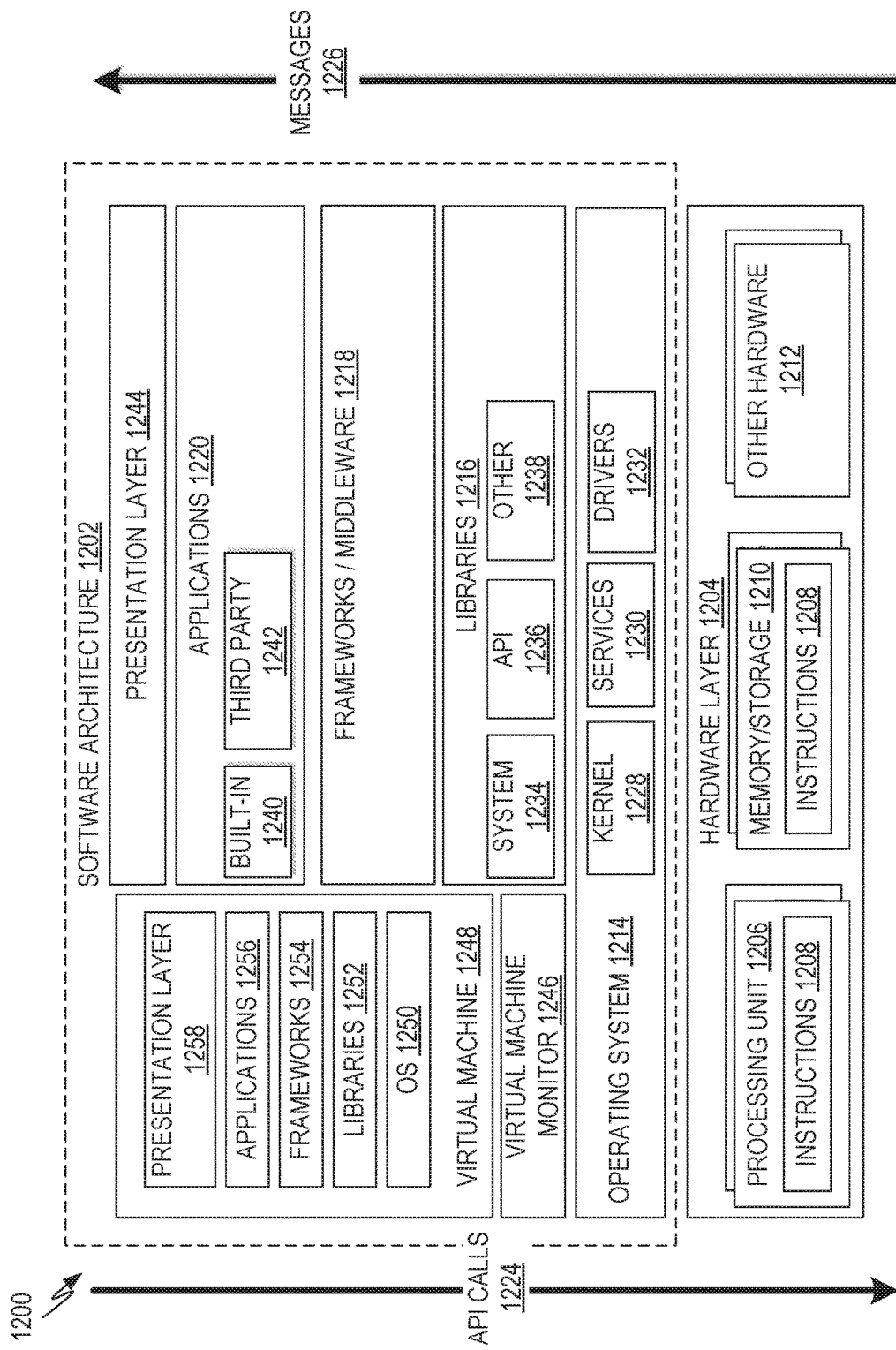
FIG. 12 is a block diagram illustrating a representative software architecture, which may be used in conjunction with various hardware architectures herein described.

FIG. 12 is a block diagram 1200 illustrating a representative software architecture 1202, which may be used in conjunction with various hardware architectures herein described. FIG. 12 is merely a non-limiting example of a software architecture, and it will be appreciated that many other architectures may be implemented to facilitate the functionality described herein. The software architecture 1202 may be executing on hardware such as a machine 1300 of FIG. 13 that includes, among other things, processors 1310, memory/storage 1330, and I/O components 1350. A representative hardware layer 1204 is illustrated in FIG. 12 and can represent, for example, the machine 1300 of FIG. 13. The representative hardware layer 1204 comprises one or more processing units 1206 having associated executable instructions 1208. The executable instructions 1208 represent the executable instructions of the software architecture 1202, including implementation of the methods, modules, and so forth of FIGS. 1-11. The hardware layer 1204 also includes memory and/or storage modules 1210, which also have the executable instructions 1208. The hardware layer 1204 may also comprise other hardware 1212, which represents any other hardware of the hardware layer 1204, such as the other hardware illustrated as part of the machine 1300.

In the example architecture of FIG. 12, the software architecture 1202 may be conceptualized as a stack of layers where each layer provides particular functionality. For example, the software architecture 1202 may include layers such as an operating system 1214, libraries 1216, frameworks/middleware 1218, applications 1220, and a presentation layer 1244. Operationally, the applications 1220 and/or other components within the layers may invoke API calls 1224 through the software stack and receive responses, returned values, and so forth, illustrated as messages 1226, in response to the API calls 1224. The layers illustrated are representative in nature and not all software architectures have all layers. For example, some mobile or special purpose operating systems may not provide a layer of frameworks/middleware 1218, while others may provide such a layer. Other software architectures may include additional or different layers.

The operating system 1214 may manage hardware resources and provide common services. The operating system 1214 may include, for example, a kernel 1228, services 1230, and drivers 1232. The kernel 1228 may act as an abstraction layer between the hardware and the other software layers. For example, the kernel 1228 may be responsible for memory management, processor management (e.g., scheduling), component management, networking, security settings, and so on. The services 1230 may provide other common services for the other software layers. The drivers 1232 may be responsible for controlling or interfacing with the underlying hardware. For instance, the drivers 1232 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1216 may provide a common infrastructure that may be utilized by the applications 1220 and/or other components and/or layers. The libraries 1216 typically provide functionality that allows other software modules to perform tasks in an easier fashion than by interfacing directly with the underlying operating system 1214 functionality (e.g., kernel 1228, services 1230, and/or drivers 1232). The libraries 1216 may include system 1234 libraries (e.g., C standard library) that may provide functions such as memory allocation functions, string manipulation functions, mathematic functions, and the like. In addition, the libraries 1216 may include API 1236 libraries such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1216 may also include a wide variety of other libraries 1238 to provide many other APIs to the applications 1220 and other software components/modules.

The frameworks 1218 (also sometimes referred to as middleware) may provide a higher-level common infrastructure that may be utilized by the applications 1220 and/or other software components/modules. For example, the frameworks 1218 may provide various graphic user interface (GUI) functions, high-level resource management, high-level location services, and so forth. The frameworks 1218 may provide a broad spectrum of other APIs that may be utilized by the applications 1220 and/or other software components/modules, some of which may be specific to a particular operating system or platform.

The applications 1220 include built-in applications 1240 and/or third party applications 1242. Examples of representative built-in applications 1240 may include, but are not limited to, a contacts application, a browser application, a book reader application, a location application, a media application, a messaging application, and/or a game application. The third party applications 1242 may include any of the built-in applications as well as a broad assortment of other applications. In a specific example, the third party application 1242 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1242 may invoke the API calls 1224 provided by the mobile operating system, such as the operating system 1214, to facilitate functionality described herein.

The applications 1220 may utilize built-in operating system 1214 functions (e.g., kernel 1228, services 1230, and/or drivers 1232), libraries 1216 (e.g., system 1234, APIs 1236, and other libraries 1238), and frameworks/middleware 1218 to create user interfaces to interact with users of the system. Alternatively, or additionally, in some systems, interactions with a user may occur through a presentation layer, such as the presentation layer 1244. In these systems, the application/module "logic" can be separated from the aspects of the application/module that interact with a user.

Some software architectures utilize virtual machines. In the example of FIG. 12, this is illustrated by a virtual machine 1248. A virtual machine creates a software environment where applications/modules can execute as if they were executing on a hardware machine (such as the machine 1300 of FIG. 13, for example). A virtual machine is hosted by a host operating system (e.g., operating system 1214 in FIG. 12) and typically, although not always, has a virtual machine monitor 1246, which manages the operation of the virtual machine as well as the interface with the host operating system (e.g., operating system 1214). A software architecture executes within the virtual machine 1248, such as an operating system 1250, libraries 1252, frameworks/middleware 1254, applications 1256, and/or a presentation layer 1258. These layers of software architecture executing within the virtual machine 1248 can be the same as corresponding layers previously described or may be different.

Example Machine Architecture and Machine-Readable Medium

Figure 13:
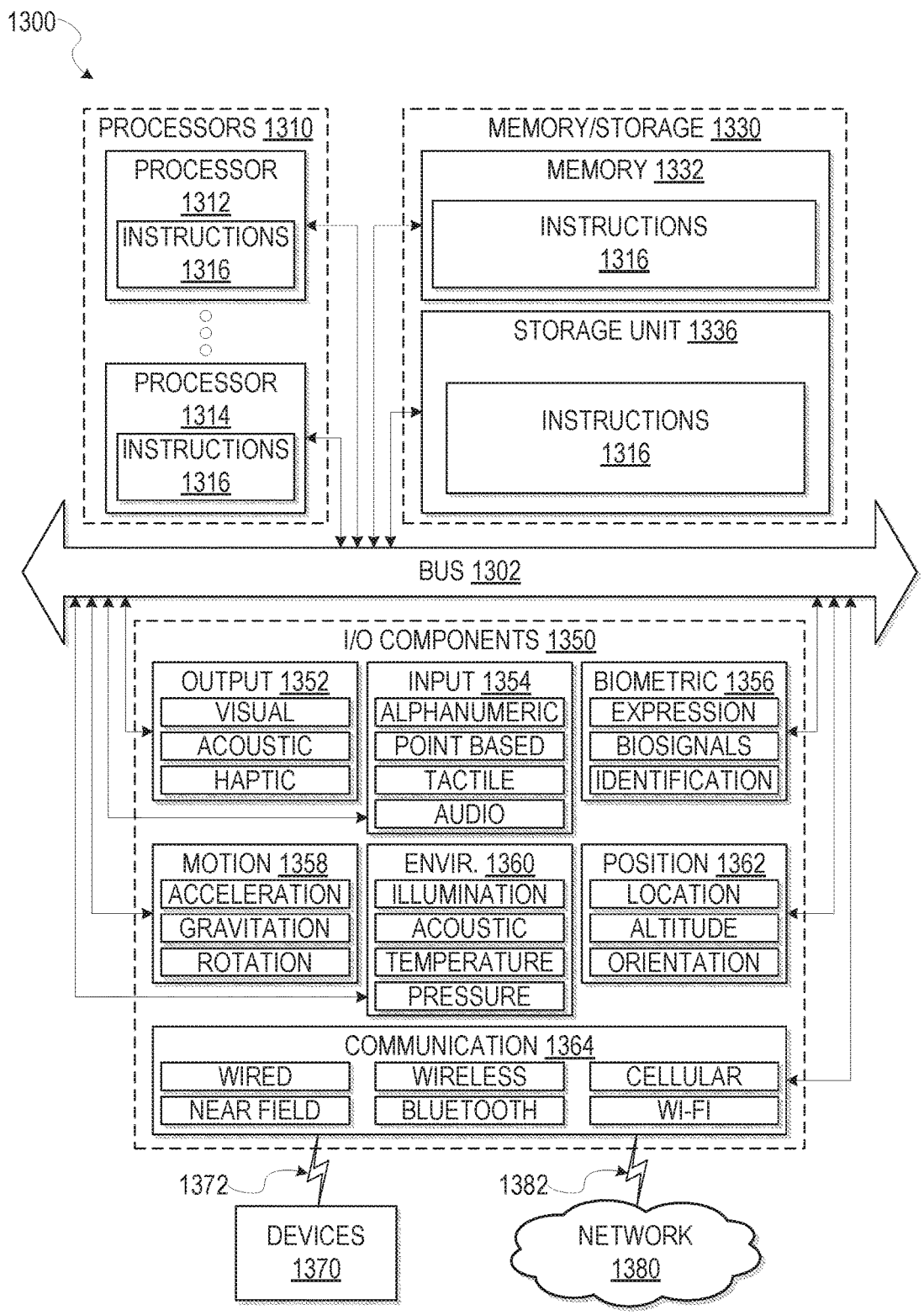
FIG. 13 is a block diagram illustrating components of a machine, according to some example embodiments, able to read instructions from a machine-readable medium (e.g., a machine-readable storage medium) and perform any one or more of the methodologies discussed herein.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. The instructions transform the general, non-programmed machine into a particular machine programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 may include processors 1310, memory/storage 1330, and I/O components 1350, which may be configured to communicate with each other such as via a bus 1302. In an example embodiment, the processors 1310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1312 and a processor 1314 that may execute the instructions 1316. The term "processor" is intended to include multi-core processors that may comprise two or more independent processors (sometimes referred to as "cores") that may execute instructions contemporaneously. Although FIG. 13 shows multiple processors 1310, the machine 1300 may include a single processor with a single core, a single processor with multiple cores (e.g., a multi-core processor), multiple processors with a single core, multiple processors with multiples cores, or any combination thereof.

The memory/storage 1330 may include a memory 1332, such as a main memory, or other memory storage, and a storage unit 1336, both accessible to the processors 1310, such as via the bus 1302. The storage unit 1336 and memory 1332 store the instructions 1316 embodying any one or more of the methodologies or functions described herein. The instructions 1316 may also reside, completely or partially, within the memory 1332, within the storage unit 1336, within at least one of the processors 1310 (e.g., within the processor's cache memory), or any suitable combination thereof, during execution thereof by the machine 1300. Accordingly, the memory 1332, the storage unit 1336, and the memory of the processors 1310 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1316. The term "machine-readable medium" shall also be taken to include any medium, or combination of multiple media, that is capable of storing instructions (e.g., instructions 1316) for execution by a machine (e.g., machine 1300), such that the instructions, when executed by one or more processors of the machine (e.g., processors 1310), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The UI/O components 1350 may include a wide variety of components to receive input, provide output, produce output, transmit information, exchange information, capture measurements, and so on. The specific I/O components 1350 that are included in a particular machine will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion and the grouping is in no way limiting. In various example embodiments, the I/O components 1350 may include output components 1352 and input components 1354. The output components 1352 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1354 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1350 may include biometric components 1356, motion components 1358, environmental components 1360, or position components 1362, among a wide array of other components. For example, the biometric components 1356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 may include acceleration sensor components (e.g., accelerometer), gravitation sensor components, rotation sensor components (e.g., gyroscope), and so forth. The environmental components 1360 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1362 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 may include a network interface component or other suitable device to interface with the network 1380. In further examples, the communication components 1364 may include wired communication components, wireless communication components, cellular communication components, Near Field Communication (NFC) components. Bluetooth® components (e.g., Bluetooth® Low Energy), Wi-Fi® components, and other communication components to provide communication via other modalities. The devices 1370 may be another machine or any of a wide variety of peripheral devices (e.g., a peripheral device coupled via a UnivUSB).

Moreover, the communication components 1364 may detect identifiers or include components operable to detect identifiers. For example, the communication components 1364 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1364, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1380 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1380 or a portion of the network 1380 may include a wireless or cellular network and the coupling 1382 may be a Code Division Multiple Access (CDMA) connection, a Global System for Mobile communications (GSM) connection, or another type of cellular or wireless coupling. In this example, the coupling 1382 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1316 may be transmitted or received over the network 1380 using a transmission medium via a network interface device (e.g., a network interface component included in the communication components 1364) and utilizing any one of a number of well-known transfer protocols (e.g., HTTP). Similarly, the instructions 1316 may be transmitted or received using a transmission medium via the coupling 1372 (e.g., a peer-to-peer coupling) to the devices 1370. The term "transmission medium" shall be taken to include any intangible medium that is capable of storing, encoding, or carrying the instructions 1316 for execution by the machine 1300, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method for selecting text snippets to display on a computer display, the method comprising:
creating a universal concept graph for phrases relevant to a search domain, the universal concept graph having a plurality of nodes and edges between nodes, each node representing a different phrase, each edge between two nodes representing a relationship between the phrases represented by the two nodes;
representing a result in the search domain as a subgraph of the universal concept graph by extracting a portion of the universal concept graph containing phrases contained in the result;
producing a score for each node of the subgraph, the score based on a graph analysis algorithm applied to the subgraph, wherein producing the score further comprises, in response to a determination that a search query is available, mapping the search query into constituent concept phrases, forming an induced weighted subgraph by selecting nodes in the subgraph that contain the constituent concept phrases, and using the induced weighted subgraph to influence the score; and
selecting the text snippets to display for the result based on the scores produced in the subgraph for phrases contained in the text snippets.

2. The method of claim 1, wherein the graph analysis algorithm is a weighted in-degree ordering algorithm.

3. The method of claim 1, wherein producing the score further comprises, in response to a determination that a member identification is available for a member to which the text snippets will be displayed, forming an induced weighted subgraph for phrases in a profile for the member and using the induced weighted subgraph to influence the score.

4. The method of claim 3, wherein the using the induced weighted subgraph includes performing a random walk algorithm on the subgraph to determine a number of steps between a node in the subgraph and a node contained in both the subgraph and the induced weighted subgraph for the member.

5. The method of claim 1, wherein the using the induced weighted subgraph includes performing a random walk algorithm on the subgraph to determine a number of steps between a node in the subgraph and a node contained in both the subgraph and the induced weighted subgraph for the search query.

6. The method of claim 1, wherein the selecting text snippets to display includes ranking the text snippets according to the scores produced in the subgraph.

7. The method of claim 1, wherein the creating comprising performing a union operation between phrases obtained from an internal source and phrases obtained from an external source and eliminating duplicates of phrases appearing in both the internal source and the external source.

8. A system comprising:
a computer-readable medium having instructions stored thereon, which, when executed by a processor, cause the system to perform operations comprising:
creating a universal concept graph for phrases relevant to a search domain, the universal concept graph having a plurality of nodes and edges between nodes, each node representing a different phrase, each edge between two nodes representing a relationship between the phrases represented by the two nodes;
representing a result in the search domain as a subgraph of the universal concept graph by extracting a portion of the universal concept graph containing phrases contained in the result;
producing a score for each node of the subgraph, the score based on a graph analysis algorithm applied to the subgraph, wherein producing the score further comprises, in response to a determination that a search query is available, mapping the search query into constituent concept phrases, forming an induced weighted subgraph by selecting nodes in the subgraph that contain the constituent concept phrases, and using the induced weighted subgraph to influence the score; and selecting the text snippets to display for the result based on the scores produced in the subgraph for phrases contained in the text snippets.

9. The system of claim 8, wherein the graph analysis algorithm is a weighted in-degree ordering algorithm.

10. The system of claim 8, wherein producing the score further comprises, in response to a determination that a member identification is available for a member to which the text snippets will be displayed, forming an induced weighted subgraph for phrases in a profile for the member and using the induced weighted subgraph to influence the score.

11. The system of claim 10, wherein the using the induced weighted subgraph includes performing a random walk algorithm on the subgraph to determine a number of steps between a node in the subgraph and a node contained in both the subgraph and the induced weighted subgraph for the member.

12. The system of claim 8, wherein the using the induced weighted subgraph includes performing a random walk algorithm on the subgraph to determine a number of steps between a node in the subgraph and a node contained in both the subgraph and the induced weighted subgraph for the search query.

13. The system of claim 8, wherein the selecting text snippets to display includes ranking the text snippets according to the scores produced in the subgraph.

14. A non-transitory machine-readable storage medium comprising instructions, which when implemented by one or more machines, cause the one or more machines to perform operations comprising:

creating a universal concept graph for phrases relevant to a search domain, the universal concept graph having a plurality of nodes and edges between nodes, each node representing a different phrase, each edge between two nodes representing a relationship between the phrases represented by the two nodes;

representing a result in the search domain as a subgraph of the universal concept graph by extracting a portion of the universal concept graph containing phrases contained in the result;

producing a score for each node of the subgraph, the score based on a graph analysis algorithm applied to the subgraph, wherein producing the score further comprises, in response to a determination that a search query is available, mapping the search query into constituent concept phrases, forming an induced weighted subgraph by selecting nodes in the subgraph that contain the constituent concept phrases, and using the induced weighted subgraph to influence the score; and selecting the text snippets to display for the result based on the scores produced in the subgraph for phrases contained in the text snippets.

15. The non-transitory machine-readable storage medium of claim 14, wherein the graph analysis algorithm is a weighted in-degree ordering algorithm.

16. The non-transitory machine-readable storage medium of claim 14, wherein producing the score further comprises, in response to a determination that a member identification is available for a member to which the text snippets will be displayed, forming an induced weighted subgraph for phrases in a profile for the member and using the induced weighted subgraph to influence the score.

17. The non-transitory machine-readable storage medium of claim 16, wherein the using the induced weighted subgraph includes performing a random walk algorithm on the subgraph to determine a number of steps between a node in the subgraph and a node contained in both the subgraph and the induced weighted subgraph for the member.

\* \* \* \* \*